United States Patent [19]
Friedel et al.

[11] 3,950,836
[45] Apr. 20, 1976

[54] METAL-CERAMIC SOLDERING CONNECTION

[75] Inventors: Rudolf Friedel, Erlangen-Bruck; Hans Ebersberger, Markt-Erlbach, both of Germany

[73] Assignee: Siemens Aktiengesellschaft, Munich, Germany

[22] Filed: Mar. 12, 1974

[21] Appl. No.: 450,484

[30] Foreign Application Priority Data
May 23, 1973 Germany............................ 2326373

[52] U.S. Cl................................. 29/191.6; 228/185
[51] Int. Cl.²...................... B32B 15/04; B32B 1/08
[58] Field of Search.................... 29/501, 502, 471.9, 29/479, 474.4, 474.5, 191.6, 191, 195 M

[56] References Cited
UNITED STATES PATENTS

| 2,018,073 | 10/1935 | Laise | 29/501 X |
|---|---|---|---|
| 2,250,986 | 7/1941 | Dobke | 29/195 M |
| 2,343,402 | 3/1944 | Clifford | 29/502 X |
| 2,737,711 | 3/1956 | Smith | 29/479 X |
| 2,839,640 | 6/1958 | Epstein | 29/474.4 X |
| 3,012,317 | 12/1961 | Wolfe | 29/479 |
| 3,069,766 | 12/1962 | Rush | 29/501 X |
| 3,397,440 | 8/1968 | Dalin | 29/501 X |

FOREIGN PATENTS OR APPLICATIONS

| 21,380 | 7/1929 | Australia | 29/501 |

*Primary Examiner*—Allen B. Curtis
*Attorney, Agent, or Firm*—V. Alexander Scher

[57] ABSTRACT

A soldering connection between metal and ceramics, wherein the parts consisting of metal and ceramics engage each other as a plug and a socket. The invention is particularly characterized in that only parts of metallic and ceramic surfaces which are next to each other are soldered to each other.

7 Claims, 9 Drawing Figures

METAL-CERAMIC SOLDERING CONNECTION

This invention relates to a metal-ceramic soldering connection wherein parts of metal and ceramics engage each other like a plug and a socket. Connections of this type are used particularly for the attachment of metal pins or for passing them through a ceramic wall, and also for attachment and fixing of tubular parts.

Heretofore, as a rule, soldering connections between metal parts and ceramic parts were placed at the front surfaces of ceramic parts, so that so-called flush solderings were produced, since these connections are more reliable. Solderings of parts of metal into recesses of ceramic bodies were avoided to the greatest extent, since there is a danger of leaks, dissolution of connection and the splitting of ceramic parts. However, such connections are desirable in certain cases, for example, for X-ray tubes which are operated with high voltages in order to produce larger creep passages by inner solderings without making the structural lengths too great.

An object of the present invention is to provide a metal-ceramic soldering connection wherein metal parts can be effectively soldered in ceramic parts.

Other objects will become apparent in the course of the following specification.

In the accomplishment of the objectives of the present invention, it was found desirable to provide a metal-ceramic soldering connection wherein only parts of metallic and ceramic surfaces which are next to each other are soldered to each other.

Then after the soldering next to locations which are soldered one to the other, there will remain hollow spaces into which the solder can move when the soldered part is heated. This makes it possible to provide the focusing part of an electronic tube for mechanical reasons and due to the required good heat conductivity of these parts with very massive metal parts which are to be soldered to a ceramic part. Then it will not happen, as is the case with usual soldering procedures, that the soldering connection will dissolve due to alternating temperature action upon the metal part to be later expected in X-ray tubes. In the usual soldering connections, this also often happens when the thermic expansion sizes are adapted to each other, since the metal part is not sufficiently elastic. Furthermore, the metal part and the ceramic part can have very different temperatures.

When the soldering of the present invention is used, the adaptation of the expansion coefficient need not be considered to a great extent.

According to an embodiment of the present invention, the ceramic parts which are to be connected with metal parts, specifically, in the case of a plug to be soldered, are coated strip-like along the axis of the plug with the solder base, namely, with strip-forming metallizations, whereby also strip-like spaces remain between them. However, a strip can also be placed around the plug in the form of a spiral. In case of larger surfaces, for example, when connecting metal tubes and ceramic tubes which fit into each other, the parts placed one over the other are soldered only by zigzag or shifting strips. This results, at the same time, in a vacuum-tight connection, since there is no extending gap any more between the strips. Nevertheless, there is sufficient free space between the parts which lie close to each other. When strips extending parallel to the axis are used, it is possible to solder additionally a ring-shaped strip to provide a vacuum-tight closure, so that the connection has substantially the shape of a comb placed around the plug to be soldered, the teeth of the comb extending parallel to the longitudinal axis of the plug.

The strip-like application of soldering can be produced, for example, by providing only strip-shaped metallizations upon the ceramic part, which then produce soldering for connection with the metal part to be soldered or with the metal part extending around the ceramic part. However, the same result is produced when a thorough metallization of the ceramic part takes place and the metal part receives a corresponding treatment, in that the surface of the metal part which lies against the ceramic part is provided with corresponding recesses, or by correspondingly shaping the metal part.

As solder can be used solders common in metal-ceramic soldering, such as copper, or when soldering molybdenum rods in thermically highly treated parts, for example, the nickel-palladium solder melting at 1237°C. When selecting a solder, it is merely necessary to make certain that the solder is sufficiently ductile.

The invention will appear more clearly from the following detailed description when taken in connection with the accompanying drawing, showing, by way of example only, preferred embodiments of the inventive idea.

Figure 1:
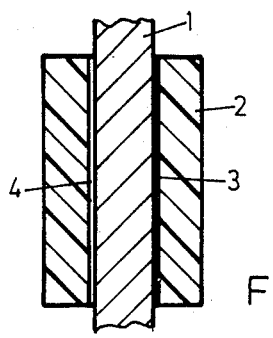
FIG. 1 is a section showing the soldering of a metal plug into a ceramic tube.
Figure 1A:
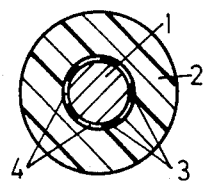
FIG. 1a is a transverse section of the device shown in FIG. 1.

FIG. 1 shows a plug 1 of molybdenum having a thickness of 2 mm. and a ceramic tube 2. As ceramics aluminum oxide ($Al_2O_3$) can be used. The illustrated section through the interconnected parts 1 and 2 is so arranged that, upon the right side of plug 1, there is visible a soldering 3, and on the left side, a free hollow space 4. FIG. 1a shows clearly that, between strip-like solderings 3, there are provided hollow spaces 4, which are also strip-like. In the illustrated construction, five soldering strips are placed around the rod 1. When the connection is heated, the expansion differences between the rod 1 and the tube 2 can be balanced, in that the material of the soldering strips 3 is pressed into the hollow spaces 4. When the expansion goes back, the material can be pulled back.

The above-described working also takes place in the embodiments of FIGS. 2 to 7, described hereinafter.

Figure 2:
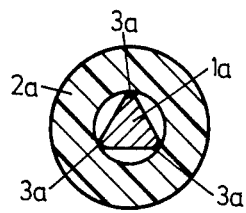
FIG. 2 is a transverse section showing a different soldering connection of a shaped metal part within a ceramic tube.

In the soldering shown in FIG. 2, the soldering strips 3a are produced by making the metal plug approximately triangular in cross-section, so that only the rounded corners engage the inner wall of the ceramic tube 2a. In principle, the same connection is produced as that shown in the construction of FIG. 1. The only difference is that here, the strips are determined by the shape of the plug.

Figure 3:
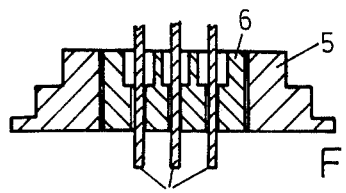
FIG. 3 is a section showing an arrangement wherein a ceramic part is soldered into a massive metal tube provided with recesses extending parallel to the axis.
Figure 3A:
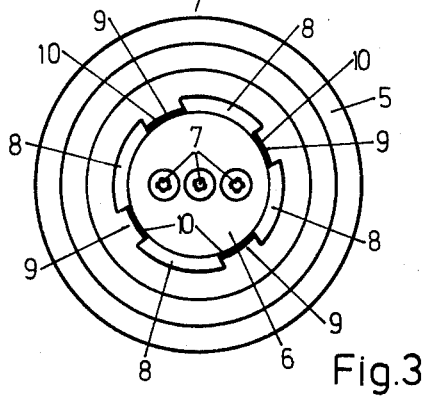
FIG. 3a is a top view of the device shown in FIG. 3.

FIG. 3 shows a metal body 5 which surrounds a ceramic body 6 provided with passages through which plugs 7 are inserted. This body can be used as a support for the cathode of an X-ray tube with rotary anodes. In this construction, the plugs 7 are introduced into the body 6 in the manner illustrated in FIGS. 1 and 2. The ceramic body is held in the metal body 5 by the provision of recesses 8 in the metal body, between which strip-like parts 9 are located which are provided with soldering layers 10 and are thus connected with the ceramic body 6. The soldering operation between the parts 5 and 6 corresponds to that between the parts 1 and 2 of FIG. 1 and FIG. 1a.

Figure 4:
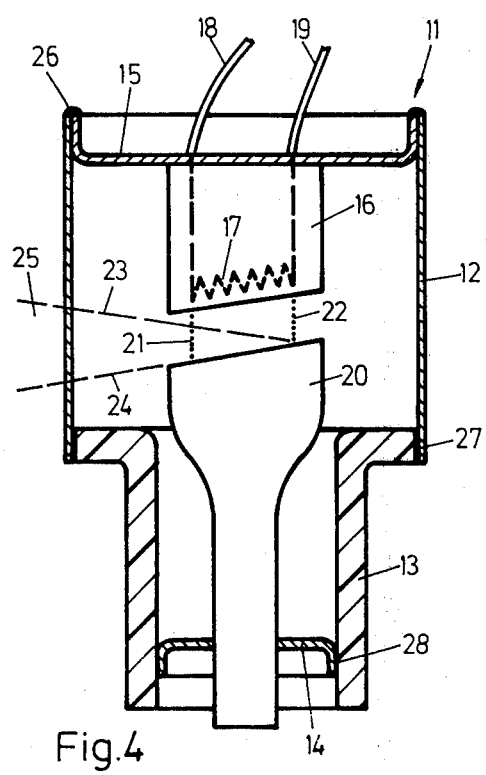
FIG. 4 is a diagrammatic section through an X-ray tube, wherein the anode is soldered by a metal cover into a ceramic tube.
Figure 5:
FIGS. 5, 6 and 7 show diagrammatically three different strip-like solderings which can be applied vacuum-tightly.

FIG. 4 shows an X-ray tube 11 having a casing consisting substantially of the metal tube 12 and ceramic tube 13, as well as cover-like closing members 14 and 15. Within the tube is located the cathode 16 attached to the cover 15 and having a glow cathode 17. The cathode 16 is connected by lines 18 and 19 with the heat voltage and one pole of the acceleration voltage. The anode 20, located opposite the cathode, is subjected to an electronic ray, which is shown as being limited by point-like lines 21 and 22. It produces a bundle of X-rays shown as being limited by broken lines 23 and 24. The cover 15 is fixed into the tube 12 by the welding 26 in the known manner. On the other hand, solders 27 and 28, between the tube 12 and the ceramic part 13, and between the cover 14 and the ceramic part, are carried out in accordance with the present invention. To provide a vacuum-tight closure, a metallizing strip is applied to the ceramic part which has the up-and-down shape shown in FIG. 5, and which is provided at locations of the solders 27 and 28. The actual soldering is carried out in such manner that a soldering ring is heated along with the parts being soldered. The solder covers the ceramic part at the metallizing strips, while hollow spaces remain in between.

Figure 6:
Figure 7:

Instead of the up-and-down shape, the solders 27 and 28 can have the zigzag shape shown in FIG. 6, or the comb-like shape shown in FIG. 7.

What is claimed is:

1. A soldering connection between a metal part and a ceramic part, one of said parts having the shape of a plug with an elongated axis, the other one having the shape of a socket and receiving the plug, wherein only portions of opposed surfaces of the plug and the socket are soldered to each other, the intermediate portions between said soldered portions being hollow and extending parallel to the axis of the plug.

2. A soldering in accordance with claim 1, wherein the portions of the opposed surfaces which are to be soldered extend spaced from each other and parallel to each other and to the axis of said plug.

3. A soldering connection between a metal part and a ceramic part in accordance with claim 1, wherein the ceramic part is metallized only at portions of opposed surfaces.

4. A soldering connection between a metal part and a ceramic part in accordance with claim 1, wherein at least one of said parts has recesses upon surface opposed to the surface of the other part.

5. A soldering connection between a metal part and a ceramic part in accordance with claim 1, wherein the surfaces of at least one of said parts have projections extending to opposed surfaces of the other part.

6. A soldering connection between a metal part and a ceramic part in accordance with claim 1, wherein, for vacuum-tight purposes, the soldering connection between the two parts has the shape of a comb.

7. A soldering connection between a metal part and a ceramic part, one of said parts having the shape of a plug with an elongated axis, the other one having the shape of a socket and receiving the plug, wherein only portions of opposed surfaces of the plug and the socket are soldered to each other, the soldered portions having the shape of an endless strip extending in curves about the axis of the plug.

* * * * *